(12) United States Patent
Krishnamoorthy et al.

(10) Patent No.: US 12,157,647 B2
(45) Date of Patent: Dec. 3, 2024

(54) UNLOADING SYSTEM AND METHOD OF USING THE SAME

(71) Applicant: INTELLIGRATED HEADQUARTERS, LLC, Mason, OH (US)

(72) Inventors: Sai Prasanth Krishnamoorthy, Pittsburgh, PA (US); Dikshya Swain, St. Louis, MO (US); Ramdas Pai, Morris Plains, NJ (US); Thomas M. Ferner, St. Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 509 days.

(21) Appl. No.: 17/392,537

(22) Filed: Aug. 3, 2021

(65) Prior Publication Data

US 2022/0041383 A1    Feb. 10, 2022

Related U.S. Application Data

(60) Provisional application No. 63/143,109, filed on Jan. 29, 2021, provisional application No. 63/060,929, filed on Aug. 4, 2020.

(51) Int. Cl.
*B65G 67/30* (2006.01)
*B65G 11/14* (2006.01)
*B65G 69/24* (2006.01)

(52) U.S. Cl.
CPC .............. *B65G 67/30* (2013.01); *B65G 11/14* (2013.01); *B65G 69/24* (2013.01);
(Continued)

(58) Field of Classification Search
CPC ........ B65G 67/30; B65G 11/14; B65G 69/24; B65G 2201/047; B65G 2203/0241;
(Continued)

(56) References Cited

U.S. PATENT DOCUMENTS 2,330,557 A * 9/1943 Collis .................... B62D 13/04
                                                          280/47.11
3,779,405 A   12/1973 Kavanaugh
(Continued)

FOREIGN PATENT DOCUMENTS

CN     108203005 A    6/2018
DE    102010024343 A1   9/2011
(Continued)

OTHER PUBLICATIONS

Extended European search report Mailed on Jan. 7, 2022 for EP Application No. 21189611, 8 pages.
EP Office Action Mailed on Jul. 17, 2024 for EP Application No. 21189611, 7 page(s).

*Primary Examiner* — Lynn E Schwenning
*Assistant Examiner* — Lucia Elba Rodriguez
(74) *Attorney, Agent, or Firm* — Alston & Bird LLP

(57) ABSTRACT

Various embodiments are directed to unloading system and methods of using the same. In various embodiments, an unloading system comprises a trailer bed configured to receive a container thereon, wherein the trailer bed comprises one or more joints configurable between a plurality of joint positions, wherein the trailer bed is configured to lift, tilt, and oscillate at least a portion of the container based on the joints; and an extendable conveyor configured to receive a box that has been released from the container and convey the box away from the trailer bed. Various embodiments are directed to a method comprising tilting the container such that an open end of the container is lower than a closed end of the container, wherein the open end of the container is
(Continued)

proximate to an extendable conveyor; and oscillating the container to facilitate release of a box from the container onto the extendable conveyor.

20 Claims, 11 Drawing Sheets

(52) U.S. Cl.
CPC ............... *B65G 2201/047* (2013.01); *B65G 2203/0241* (2013.01); *B65G 2814/0205* (2013.01); *B65G 2814/0323* (2013.01)

(58) Field of Classification Search
CPC .... B65G 2814/0205; B65G 2814/0323; B65G 47/24; B65G 65/005; B65G 65/23; B65G 69/22; B65G 2203/02
See application file for complete search history.

(56) References Cited

U.S. PATENT DOCUMENTS

| | | | | |
|---|---|---|---|---|
| 5,538,391 A | * | 7/1996 | Bonnet | B65G 59/005 414/796.5 |
| 5,797,716 A | * | 8/1998 | Herrin | B65B 69/00 414/420 |
| 2020/0211300 A1 | * | 7/2020 | Helms | H04Q 9/00 |

FOREIGN PATENT DOCUMENTS

| | | | | |
|---|---|---|---|---|
| DE | 202015009555 U1 | | 3/2018 | |
| JP | 11322082 A | * | 11/1999 | |
| WO | WO-2008145223 A1 | * | 12/2008 | ............. B65G 65/23 |
| WO | WO-2020176706 A1 | * | 9/2020 | ............ B65B 69/005 |

\* cited by examiner

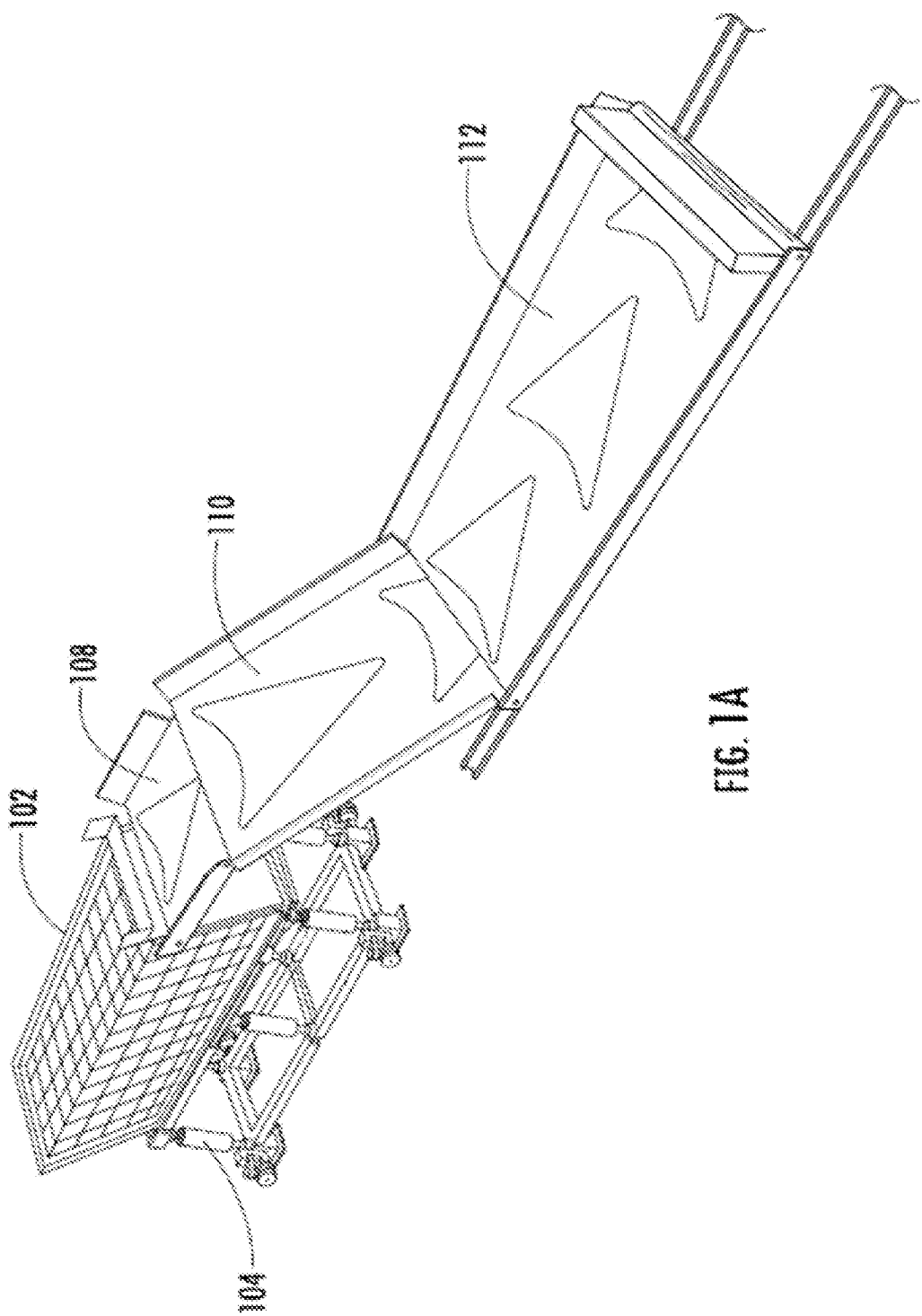

UNLOADING SYSTEM AND METHOD OF USING THE SAME

CROSS-REFERENCE TO RELATED APPLICATIONS

This patent application claims priority from provisional Patent Application Ser. No. 63/060,929, filed Aug. 4, 2020, entitled "CITADEL UNLOADER AND ACTIVE EXTENDABLE CONVEYOR," and from provisional Patent Application Ser. No. 63/143,109, filed Jan. 29, 2021, entitled "CITADEL UNLOADER AND ACTIVE EXTENDABLE CONVEYOR," each of which is incorporated herein by reference in its entirety.

FIELD OF THE INVENTION

The present application relates generally to a trailer unloading apparatus that tilts and uses oscillations to unload the trailer and an extendible conveyor in a material handling environment.

BACKGROUND

In material handling applications, unloading trailers, semi-truck trailers, shipping containers, and etc., can be a time-intensive and labor-intensive process below.

BRIEF SUMMARY

Various embodiments are directed to unloading system and methods of using the same. In various embodiments, an unloading system may comprise a trailer bed configured to receive a container thereon, wherein the trailer bed comprises one or more joints configurable between a plurality of joint positions, wherein the trailer bed is configured to lift, tilt, and oscillate at least a portion of the container based at least in part on the joints; and an extendable conveyor configured to receive a box that has been released from the container and convey the box away from the trailer bed.

In various embodiments, the extendable conveyor may comprise a slide and a conveyor, wherein the slide receives the box that has been released from the container, and the conveyor receives the box from the slide and conveys the box away from the trailer bed. In various embodiments, the one or more joints may comprise a telescoping joint. In various embodiments, the container is oscillated at least one of laterally, vertically, and rotationally. In various embodiments, the unloading system may further comprise a closed loop feedback system that optimizes the lifting, tilting, and oscillating of the container to improve trailer unloading. In certain embodiments, the closed loop feedback system may comprise a set of sensors that measure container volume and box throughput. In certain embodiments, at least a portion of the set of sensors may be installed at the trailer bed.

In various embodiments, the trailer bed may comprise a set of multi-axial wheels to maneuver the trailer bed. In various embodiments, the set of multi-axial wheels may be configured to maneuver the trailer bed in a lateral direction from a first lateral position to a second lateral position. In various embodiments, the trailer bed may comprise a flood gate that can be at least partially opened to release the box from the container. In certain embodiments, at least partially opening the flood gate of the trailer bed may comprise lowering at least a portion of the flood gate. In certain embodiments, the extendable conveyor may comprise a platform that can be selectively positioned based at least in part on a height of a top of the flood gate to reduce a distance that the box falls. Further, in certain embodiments, selectively positioning the platform may comprise one or both of raising and lowering the platform to match the height of the top of the flood gate.

In various embodiments, the container may be tilted at least one of laterally and vertically. In various embodiments, at least a portion of the extendable conveyor may be selectively configurable between a plurality of longitudinal conveyor positions based at least in part on a length of the container. In various embodiments, the trailer bed may further comprise at least one locking mechanism configured to secure at least a portion of the container relative to the trailer bed.

Various embodiments are directed to a method comprising tilting the container such that an open end of the container is lower than a closed end of the container, and that the open end of the container is proximate to an extendable conveyor; and oscillating the container to facilitate release of a box from the container onto the extendable conveyor.

In various embodiments, the method may further comprise controlling the oscillating and tilting to optimize throughput and minimize damage to the box. Further, in various embodiments, the method may further comprise at least partially opening a flood gate positioned at least substantially proximate the open end of the container from a first flood gate position to a second flood gate position. In certain embodiments, the method may further comprise adjusting a height of at least a portion of the extendable conveyor based at least in part on the second flood gate position.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified. Reference will now be made to the accompanying drawings, which are not necessarily drawn to scale, and wherein:

FIGS. 1A-1C illustrate example citadel unloaders with trailer and extendable conveyors in accordance with various aspects and embodiments of the subject disclosure;

DETAILED DESCRIPTION

Figure 1B:
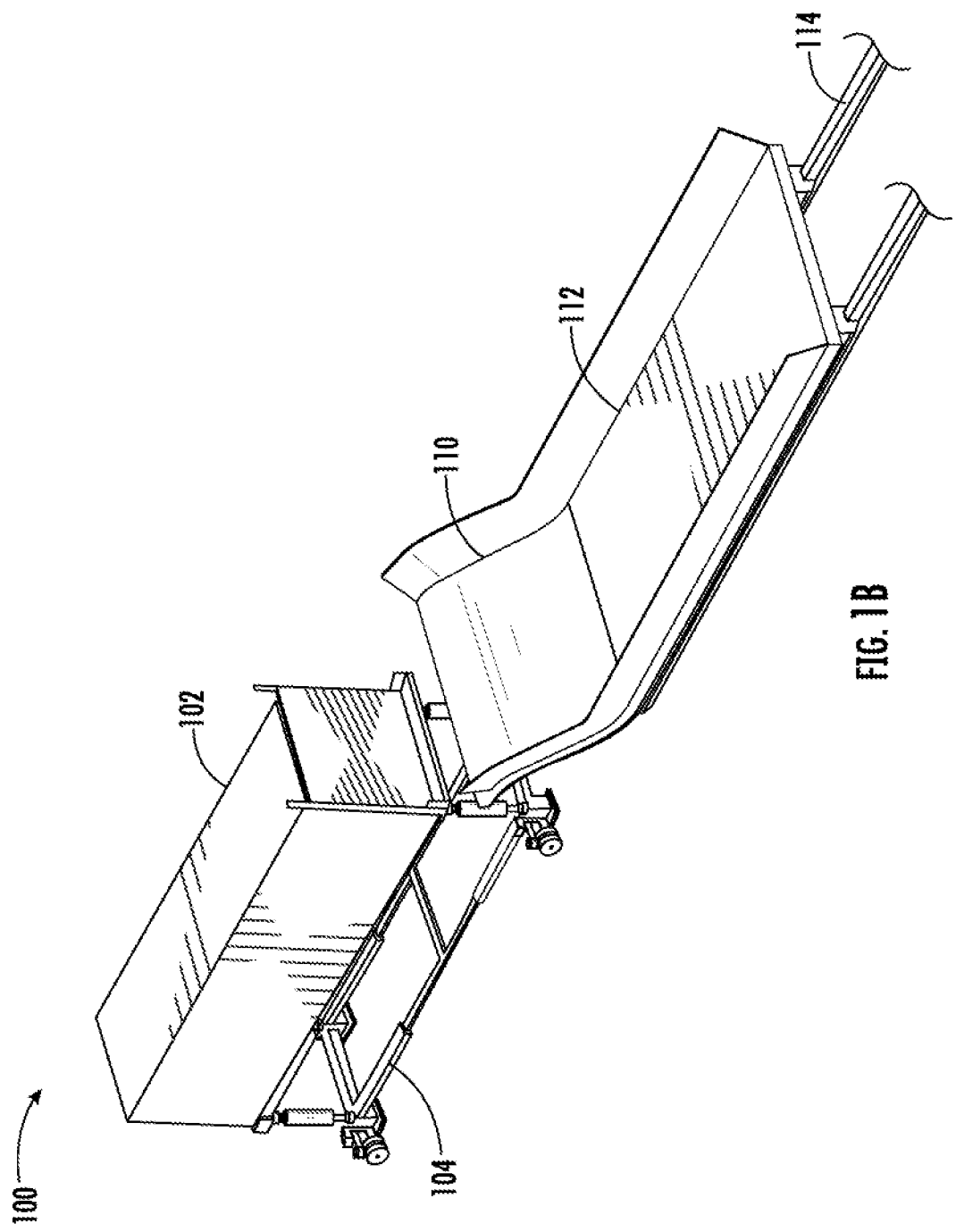

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details.

Various embodiments disclosed herein provide for a citadel unloader and active extendable conveyor to facilitate unloading a trailer or shipping container. The citadel unloader can lift the trailer or shipping container (to simplify, herein referred to simply as "trailer") and tilt the trailer to unload the boxes or items inside the trailer. The citadel unloader can also oscillate laterally, vertically or rotationally in order to increase the flow of the containers while reducing the damage caused to the boxes or items while being unloaded. An extendable conveyor can catch the boxes and convey the boxes into a material handling system.

By having a citadel unloader on which trailers can be mounted, this enables a trailer unloading solution that does not require changes to be made to the trailers, since the unloader is compatible with existing trailers and shipping containers, which can be mounted or parked thereon.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Figure 1C:
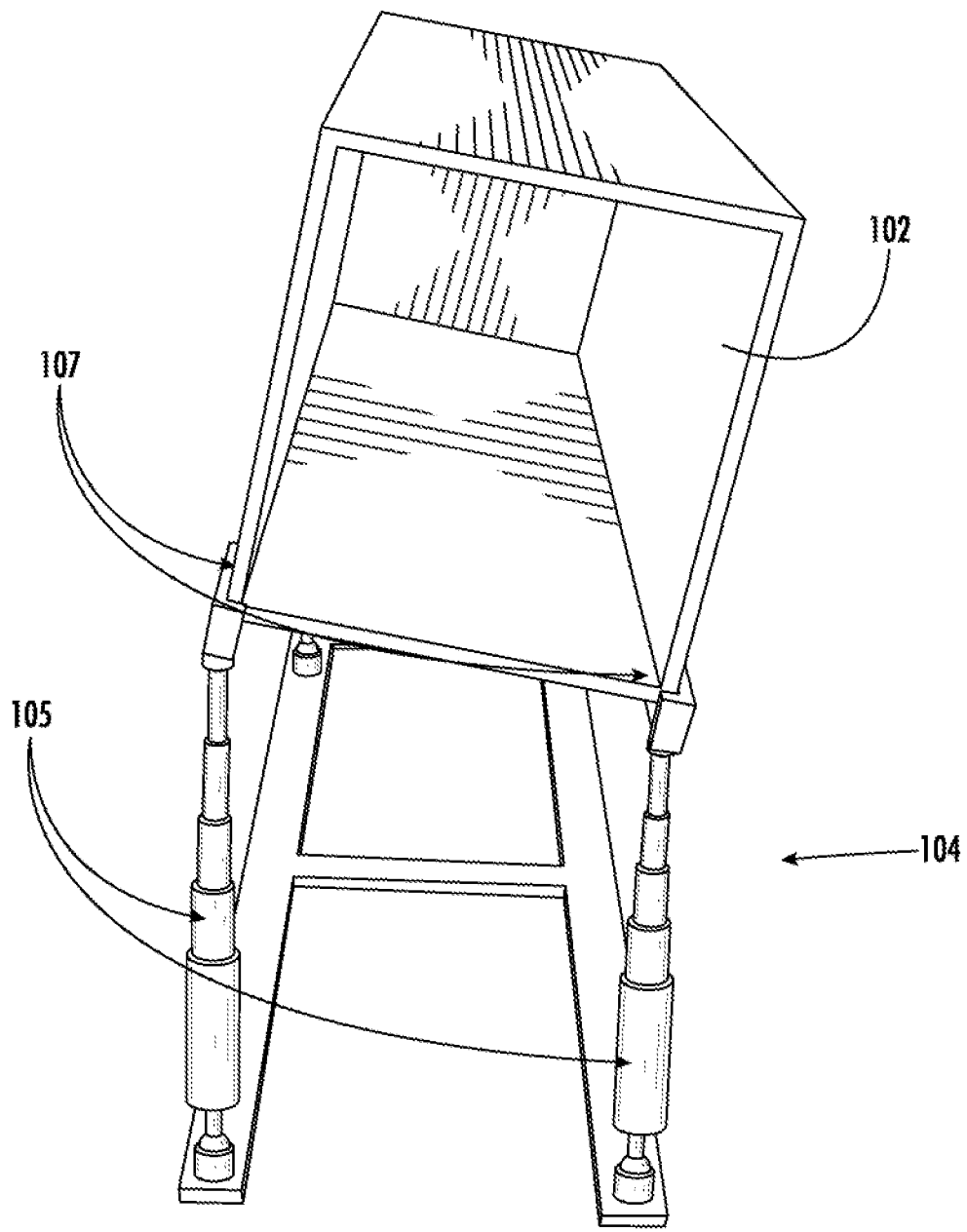

Turning now to FIGS. 1A-1C, illustrated are various example citadel unloader with a trailer and an extendable conveyor 100 in accordance with various aspects and embodiments of the subject disclosure.

In an embodiment, trailer 102 (semi truck trailer, shipping container, etc.) can be parked or mounted on a citadel unloader 104. The unloader can lift the trailer and tilt the trailer to unload boxes, parcels, or items from the trailer onto an extendable conveyor 112. As illustrated in FIG. 1A, an exemplary extendable conveyor 100 may include a platform 108 and slide 110 that can be adjusted in angle and height to match the height of the citadel unloader 104 and trailer 102. In such an exemplary embodiment, the platform 108 and slide 110 can catch the boxes and provide a gradual slope down to the conveyor 112 so as to decrease impact forces on the conveyor. Alternatively, or additionally, as illustrated in FIG. 1B, an exemplary extendable conveyor 100 may can include a slide 110 that can be adjusted in angle and height to match the height of the citadel unloader 104 and trailer 102. In such an exemplary embodiment, the slide 110 may catch the boxes and provide a gradual slope down to the conveyor 112 so as to decrease impact forces on the conveyor. Further, in various embodiments, an exemplary unloading system may comprise an extendable conveyor 112 wherein at least a portion of the expandable conveyor 112 may be selectively configurable between a plurality of longitudinal conveyor positions based at least in part on a length of the container 102. For example, in various embodiments, the conveyor can extend along rails 114 to meet the unloader 104.

In an embodiment, one or both of the platform 108 and the slide 110 can comprise a set of rollers to facilitate movement of the boxes down the platform 108 and slide 110. In other embodiments, one or both of the platform 108 and the slide 110 can be metal or have a surface compound (e.g., nano-compound coating, Teflon, etc.) to decrease the surface friction of the platform 108 and/or the slide 110. The surface compound can be scratch resistant and/or hydrophobic.

In an embodiment, the extendable conveyor 112 can comprise motorized drive rollers or can comprise a belt conveyor or other common conveying means to move the items that arrive via the slide 110 to the material handling system.

As illustrated in FIG. 1C, in various embodiments, the citadel unloader 104 may comprise at least one joint 105 configurable between a plurality of joint positions to lift, tilt and jiggle and/or oscillate the trailer 102. For example, in various embodiments, the citadel unloader 104 may comprise at least substantially between two and ten joints 105 (e.g., at least approximately six joints) to lift, tilt and jiggle and oscillate the trailer 102 based at least in part on at least one of the joints 105 being reconfigured from a first joint position to a second joint position. As illustrated, in various embodiments, one or more of the at least one joint 105 of the citadel unloader 104 may comprise a telescopic joint. The citadel unloader can also comprise one or more locking mechanism 107 on each corner mount the trailer 102 and prevent it from sliding while tilted. In an embodiment, the unloader 104 can comprise an electrohydraulic system configured to vertically lift a trailer 102 disposed on the unloader 104, laterally and/or vertically tilt the trailer 102, and/or laterally, vertically, and/or or rotationally oscillate the trailer 102 in order to facilitate release of the boxes while tilted. The electrohydraulic system can be damped to reduce the impact forces of the boxes on the side of the trailer 102.

In an embodiment, the unloader 104 can comprise a set of multi-axial wheels to maneuver the unloader 104. For example, in various embodiments, the set of multi-axial wheels of the unloader 104 may be configured to maneuver the trailer bed in one or more lateral directions from a first lateral position to a second lateral position. For example, in various embodiments, the set of multi-axial wheels of the unloader 104 may comprise a suspension mechanism that facilitates movement of the unloader 104 from one dock door to a second dock door positioned a lateral distance away therefrom. The wheels can include a drive mechanism such that the citadel oscillator/unloader 104 can be self-propelled. In other embodiments, the citadel unloader 104 can be maneuvered by another vehicle.

In an embodiment, the trailer 102 can be just a shipping container that has been placed on the unloader 104. In other embodiments, the trailer 102 can be a semi-truck trailer that has been parked on top of the unloader while in a lowered position.

Figure 2A:
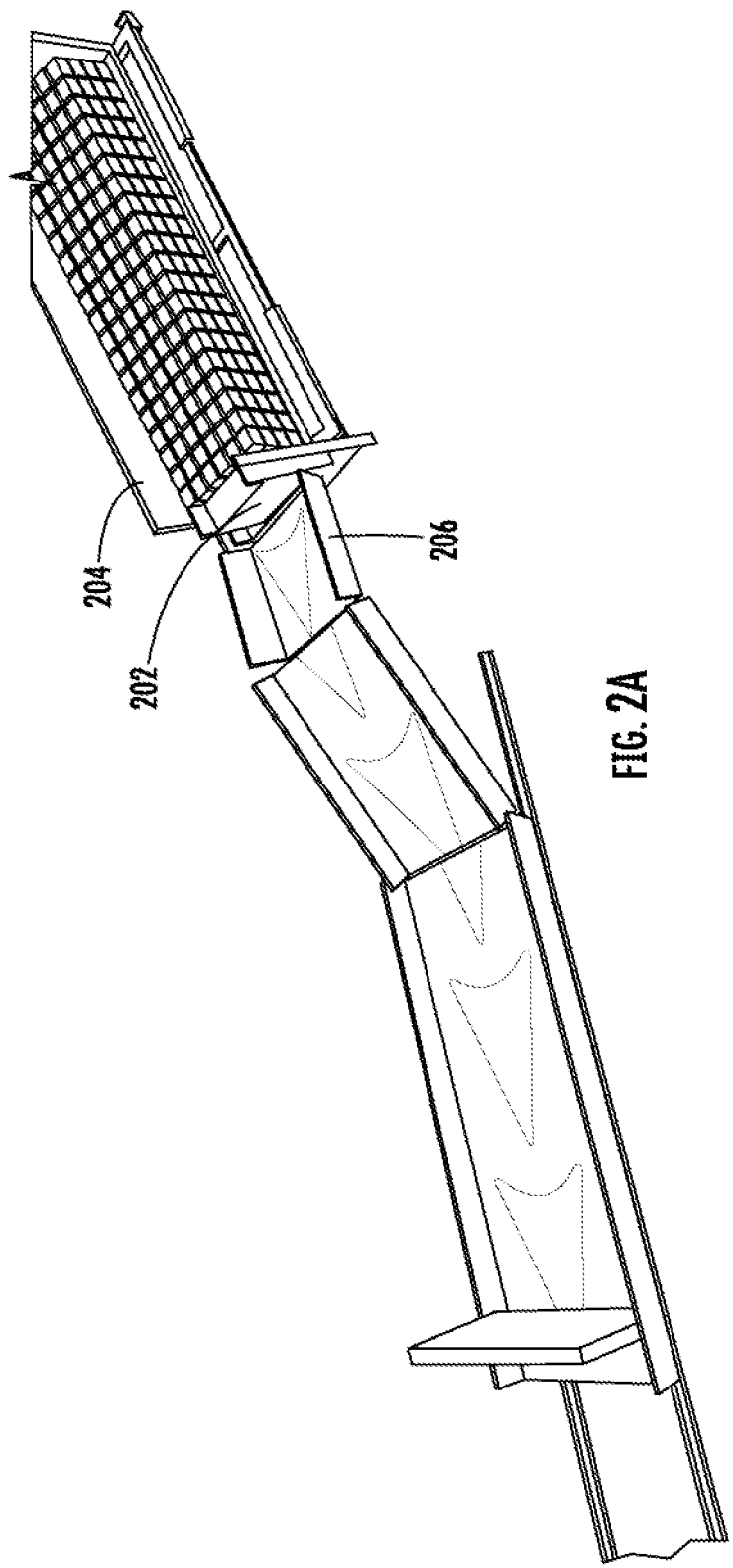
FIGS. 2A-2C illustrate example citadel unloaders with trailers unloading boxes and extendable conveyors in accordance with various aspects and embodiments of the subject disclosure.
Figure 2B:
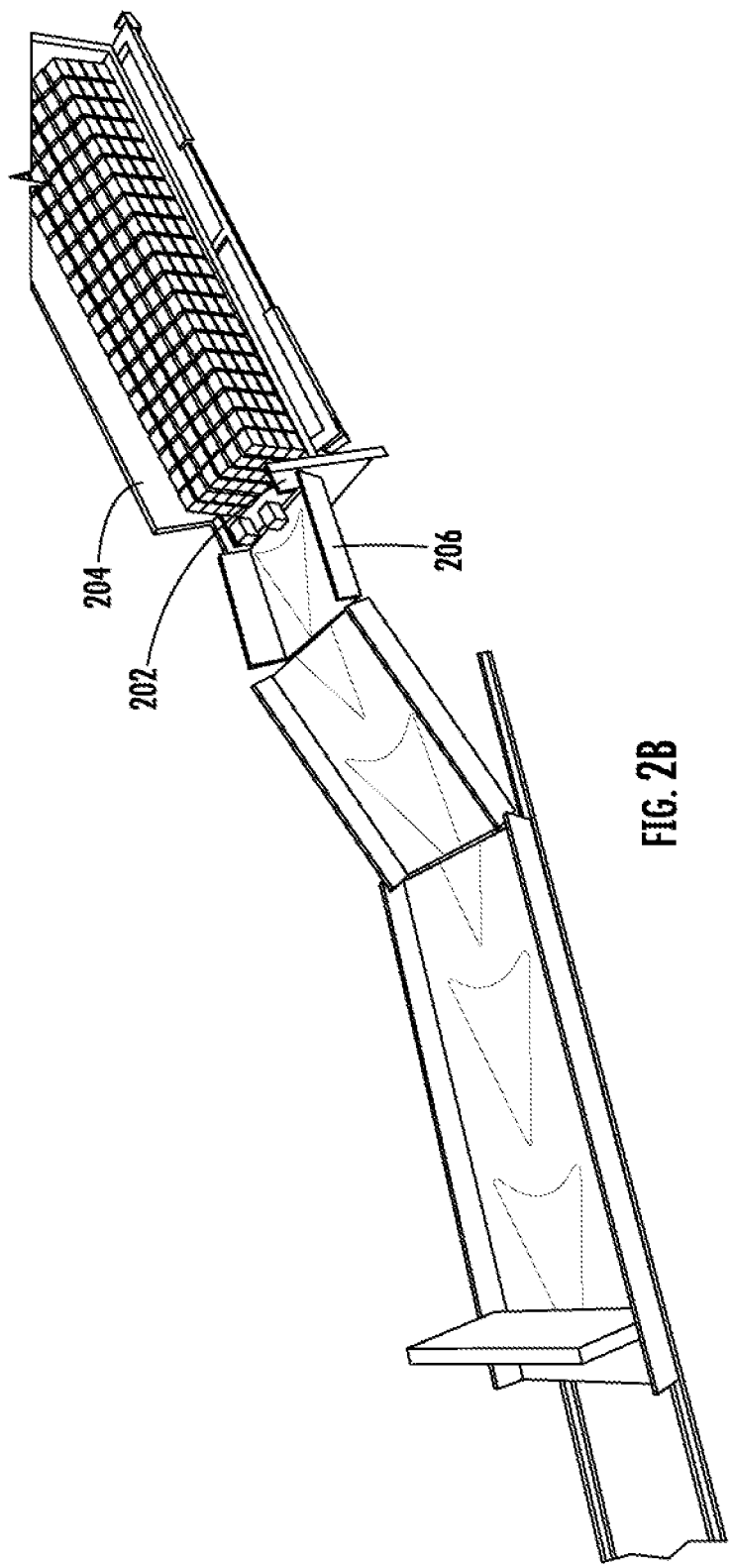
Figure 2C:
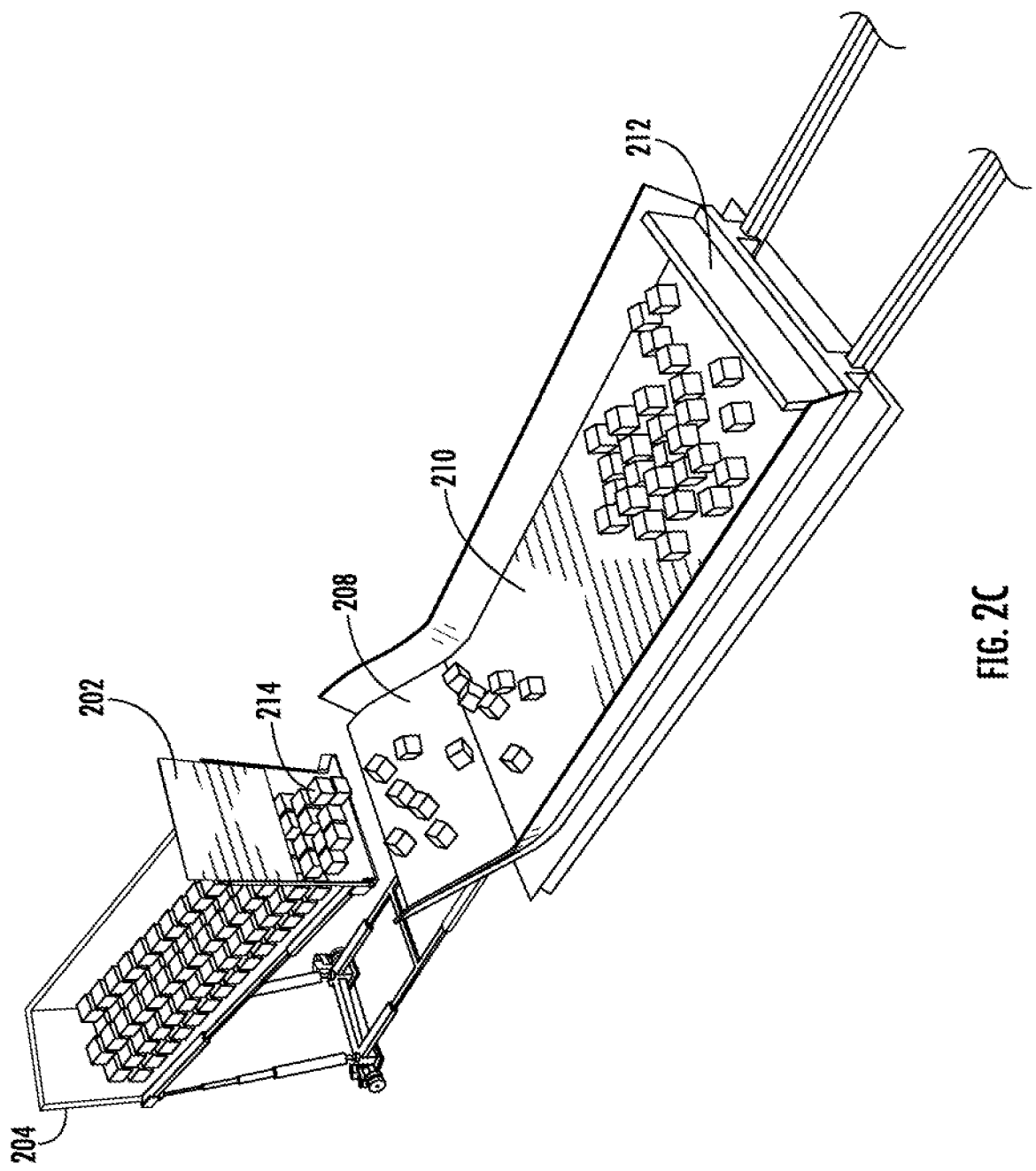

Turning now to FIGS. 2A-2C, illustrated are example citadel unloaders with trailers unloading boxes and extendable conveyors configured for catching the boxes in accordance with various aspects and embodiments of the subject disclosure. In particular, FIG. 2A illustrates an example citadel unloader with a trailer unloading boxes and an extendable conveyor 200a ready to catch the boxes in accordance with various aspects and embodiments of the subject disclosure.

In an embodiment, the trailer 204 can be repeatedly tilted forward (with the edge closest to the extendable conveyor platform 206, the slide 208, and/or the extendable conveyor 210 tilted down) and backwards to release a set of boxes per cycle while also laterally oscillating. For example, in various embodiments, an exemplary unloader may comprise one or more joints that may be moved from a first joint position to a second joint position so as to cause a trailer 204 disposed on the unloader to be tilted forward. For example, in such an exemplary circumstance, the unloader (e.g., the one or more joints) may be selectively configured so as to cause an open end of the trailer 204 to be arranged lower than a closed end of the trailer 204, such that the length of the trailer 204 defines is arranged in an angled position relative to a horizontal plane. For example, in various embodiments, an unloader (e.g., the one or more joints) may be configured to such that a length of the trailer 204 is positioned at an angle of at least substantially between 1 degree and 15 degrees (e.g., between 6 degrees and 8 degrees) relative to a horizontal plane.

The frequency of the tilting process and the level of tilt, as well as the amplitude and direction of the oscillations can be controlled in a closed loop feedback system to minimize damage to the boxes and increase throughput, based on the size of the boxes, weight of the boxes, etc. In an embodiment, the closed loop feedback system can include a vision feedback system with one or more photoeyes sensor installed at the unloader near the flood gate 202 that can determine the number of boxes that have exited the trailer 204. If no boxes have egressed, the trailer 204 can be tilted to a steeper angle, if a predefined number of boxes have egressed, and then no additional boxes exit the trailer 204, the vision system can determine that the container 204 is empty. In an embodiment, a 3D vision camera facing inside the container could be installed to check the box volume being unloaded or track boxes for tamper-evidence or damage. The 3D vision camera can also work in conjunction with photo eyes to be used to determine the oscillation and pitching frequency and magnitude.

In various embodiments, a flood gate 202 that is part of the unloader (e.g., 104) may be opened or closed (e.g., lowered or raised) in order to control the throughput of the boxes. For example, a flood gate 202 may be at least partially opened to release one or more boxes from a trailer 204. For example, a flood gate 202 that is part of the unloader (e.g., 104) can be at least partially opened by at least partially lowering the gate 202 to control the throughput of the boxes. In various embodiments, a closed flood gate 202 may be arranged so as to at least substantially cover an opening of a trailer 204, and at least partially opened by lowering the gate 202 such that a top portion of the gate 202 is moved in a vertically downward direction so as to at least partially expose the opening of the trailer 204. For example, in various embodiments, the flood gate 202 can be gradually opened (e.g., lowered) when the trailer 204 is tilted forward and closed (e.g., raised) when the trailer is 204 is tilted backwards.

In various embodiments, an unloading system may comprise a platform 206 configured to receive a box dispensed from the trailer 204. In various embodiments, the platform 206 may be selectively positioned based at least in part on a height of a top of the flood gate to reduce a distance that the box falls. For example, in various embodiments, platform 206 can be raised or lowered to match the height of the top of the flood gate 202 in order to catch the boxes and reduce the fall height of the boxes. For example, FIG. 2B illustrates an example citadel unloader with a trailer unloading boxes and an extendable conveyor 200b, wherein flood gate 202 is lowered, and a platform 206 is adjusted to match the height of the flood gate 202 in order to catch the boxes that are being emptied out of the trailer 204.

Further, FIG. 2C illustrates an example citadel unloader with a trailer unloading boxes and an extendable conveyor 200c catching the boxes in accordance with various aspects and embodiments of the subject disclosure. as illustrated, in various embodiments, slide 208 can catch the boxes 214 and the conveyor 210 can convey the boxes 214 towards the rear of the conveyor 210. In various embodiments, a conveyor apparatus (e.g., extendable conveyor 200c) can have a gate 212 that can hold the boxes 214 until a predetermined number of boxes have been loaded onto the conveyor 210 or until another conveyor is ready to transfer the boxes into a warehouse or material handling system.

Figure 3A:
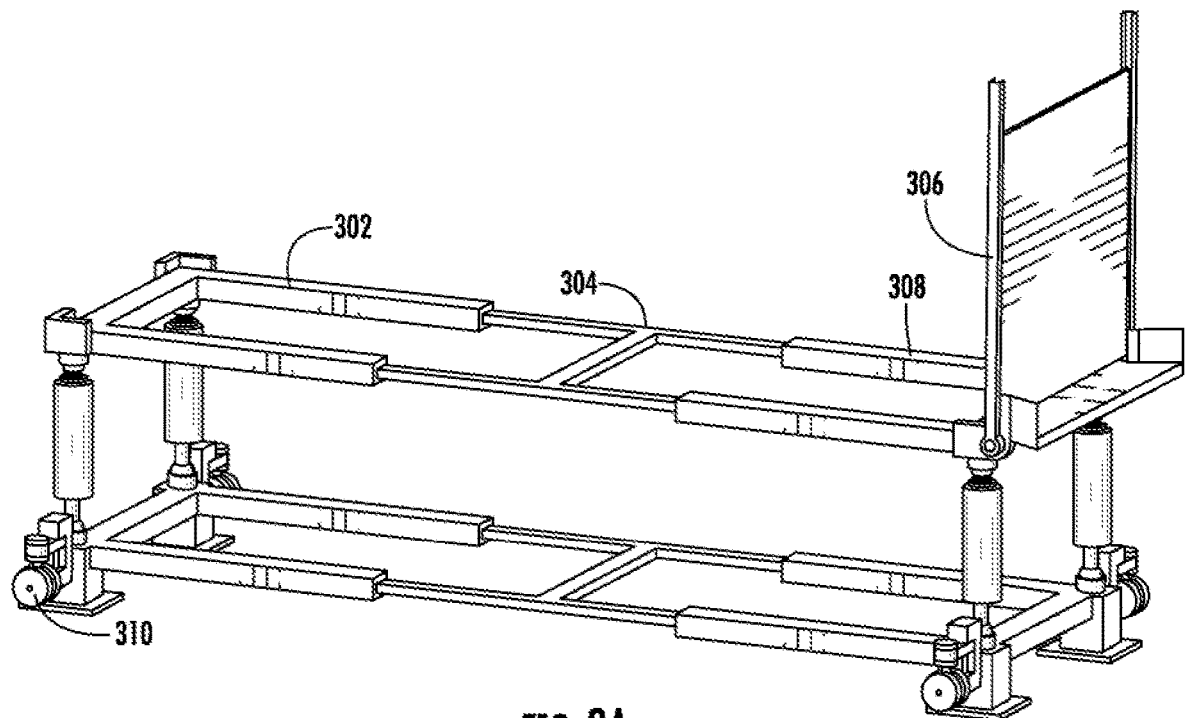
FIG. 3A illustrates an example citadel unloader in an extended position in accordance with various aspects and embodiments of the subject disclosure.

Turning now to FIG. 3A, illustrated is an example citadel unloader in an extended position in accordance with various aspects and embodiments of the subject disclosure.

Figure 3B:
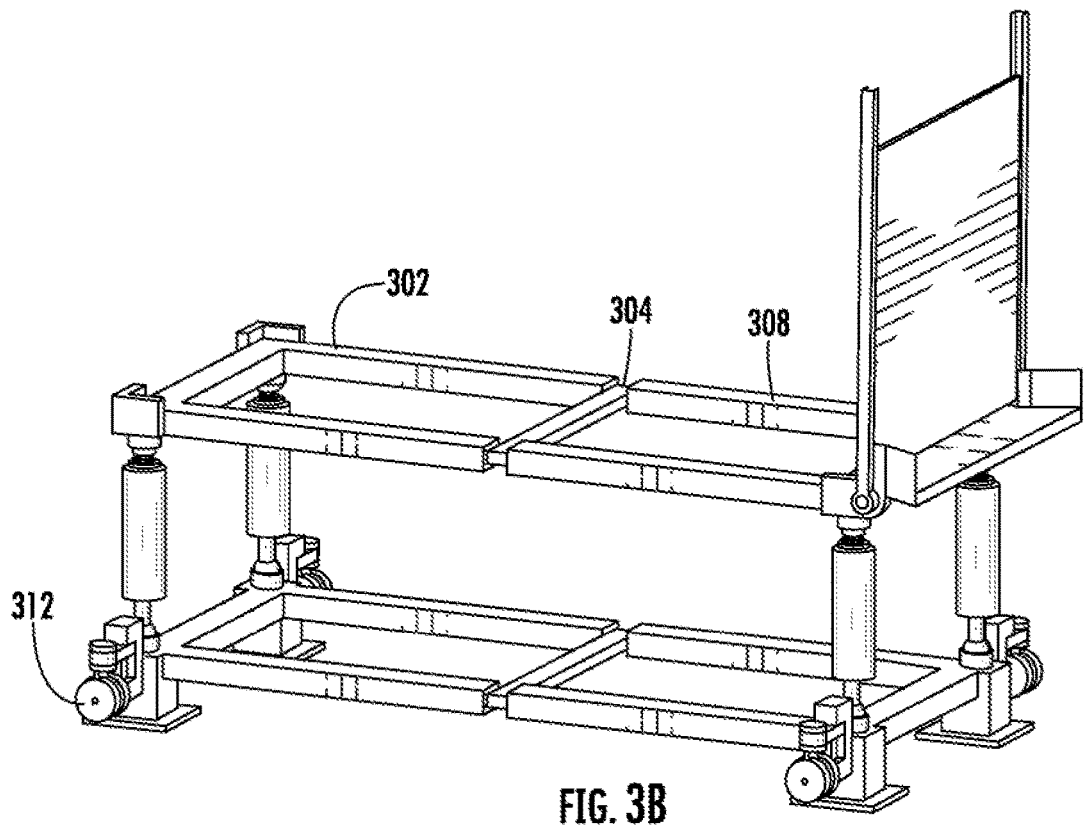
FIG. 3B illustrates an example citadel unloader in a retracted position in accordance with various aspects and embodiments of the subject disclosure.
Figure 4:
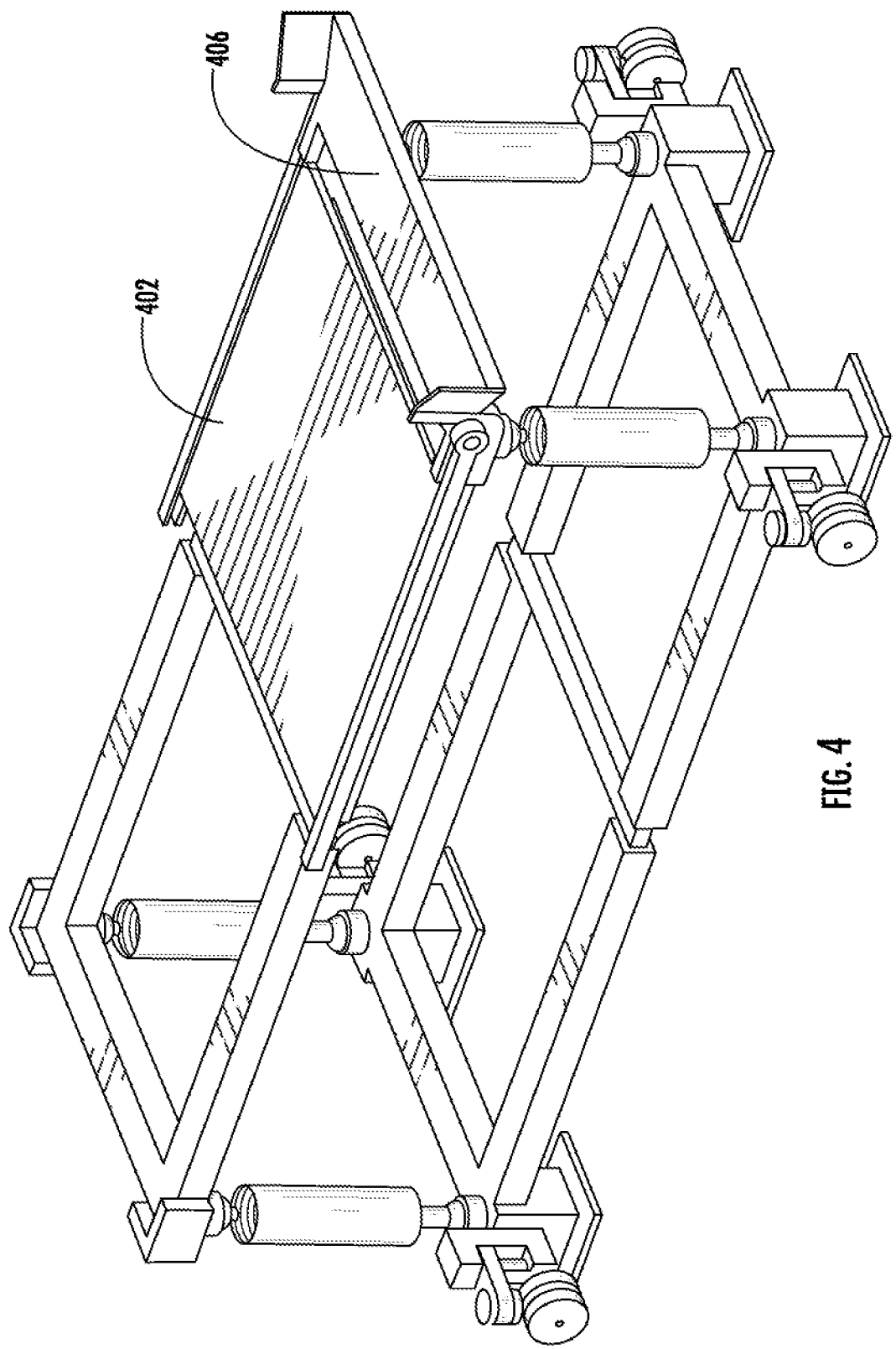
FIG. 4 illustrates an example citadel unloader with a folded gate in accordance with various aspects and embodiments of the subject disclosure.

In this embodiment, the citadel unloader can comprise a front portion 308 and a rear portion 302 that can slide along a rail 304 in order to extend and retract so as to fit a variety of size of containers. FIG. 3B shows the citadel unloader in a retracted position so as to mount a shorter trailer/container than in the configuration shown in FIG. 3A. In an embodiment, the gate 306 can be mounted directly to the trailer and can be upright as in FIG. 3B, or can fold down (e.g., gate 402) in FIG. 4.

In an embodiment, the front and rear portions can also widen or narrow in order to mount to trailers or containers with variable widths.

In another embodiment, the citadel unloader can include wheels (e.g., 310) that can operate to maneuver the citadel unloader into position so that boxes will be delivered on to the slide of the extendable conveyor. The wheels can also facilitate movement of the citadel unloader to different extendable conveyors. In an embodiment, the wheels 310 can be multi-axial and include a suspension mechanism to move the citadel oscillator from one dock door to another.

Figure 5:
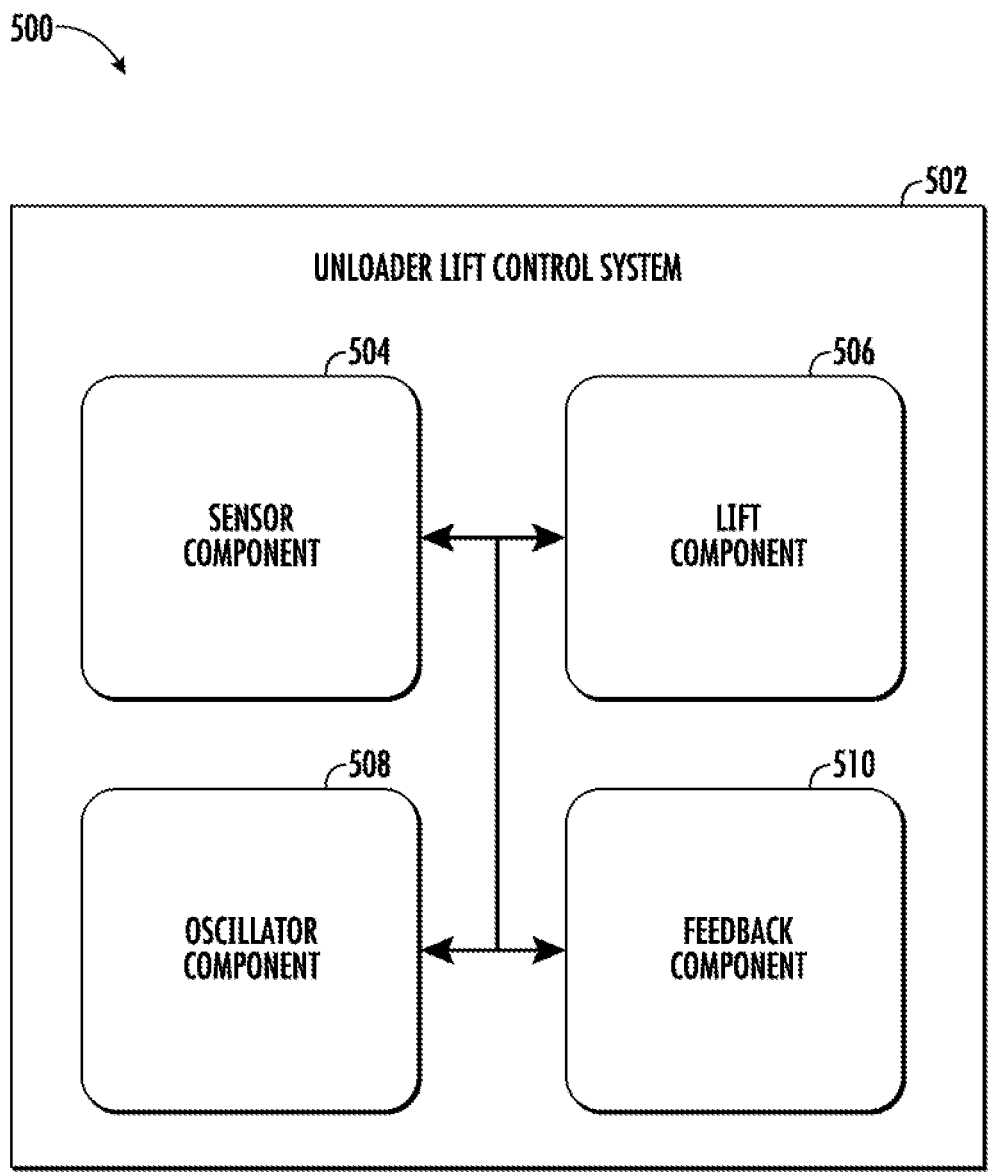
FIG. 5 illustrates an example block diagram of an unloader lift control system in accordance with various aspects and embodiments of the subject disclosure.

Turning now to FIG. 5, illustrated is an example block diagram of an unloader lift control system 500 in accordance with various aspects and embodiments of the subject disclosure. The unloader lift control system 502 can be a closed loop feedback system that can use sensor data and camera data to control the lifting, tilting, and oscillation of the unloader in order to optimize unloading throughput and/or minimize damage to the boxes. The sensor component 504 can receive data from one or more photogate sensors or camera at the front or opening of the trailer, such as, for example, one or more sensors installed at a trailer bed at least substantially proximate the opening of a trailer disposed on the trailer bed, in order to determine the number or volume of boxes that have exited the trailer. The cameras or sensors can be mounted on the gate of the unloader, elsewhere on the unloader or can be mounted in the trailers. Another camera or vision sensor can observe the back of the trailer to determine the number of boxes remaining, percentage of open area, or otherwise determine how much of the trailer remains to be unloaded. The feedback component 510 can take the data received from the sensor component 504 and determine the operations to unload the trailer including determining the tilt cycle (time taken to tilt forward and backwards) the oscillation frequency, type of oscillation (lateral, vertical, rotational etc.), amplitude of oscillation, as well as determine how wide open the gate should be to optimize unloading of the truck. The feedback component 510 can provide instructions to the lift component 506 and the oscillator component 508 to control the lifting/tilting and the oscillating respectively.

Figure 6:
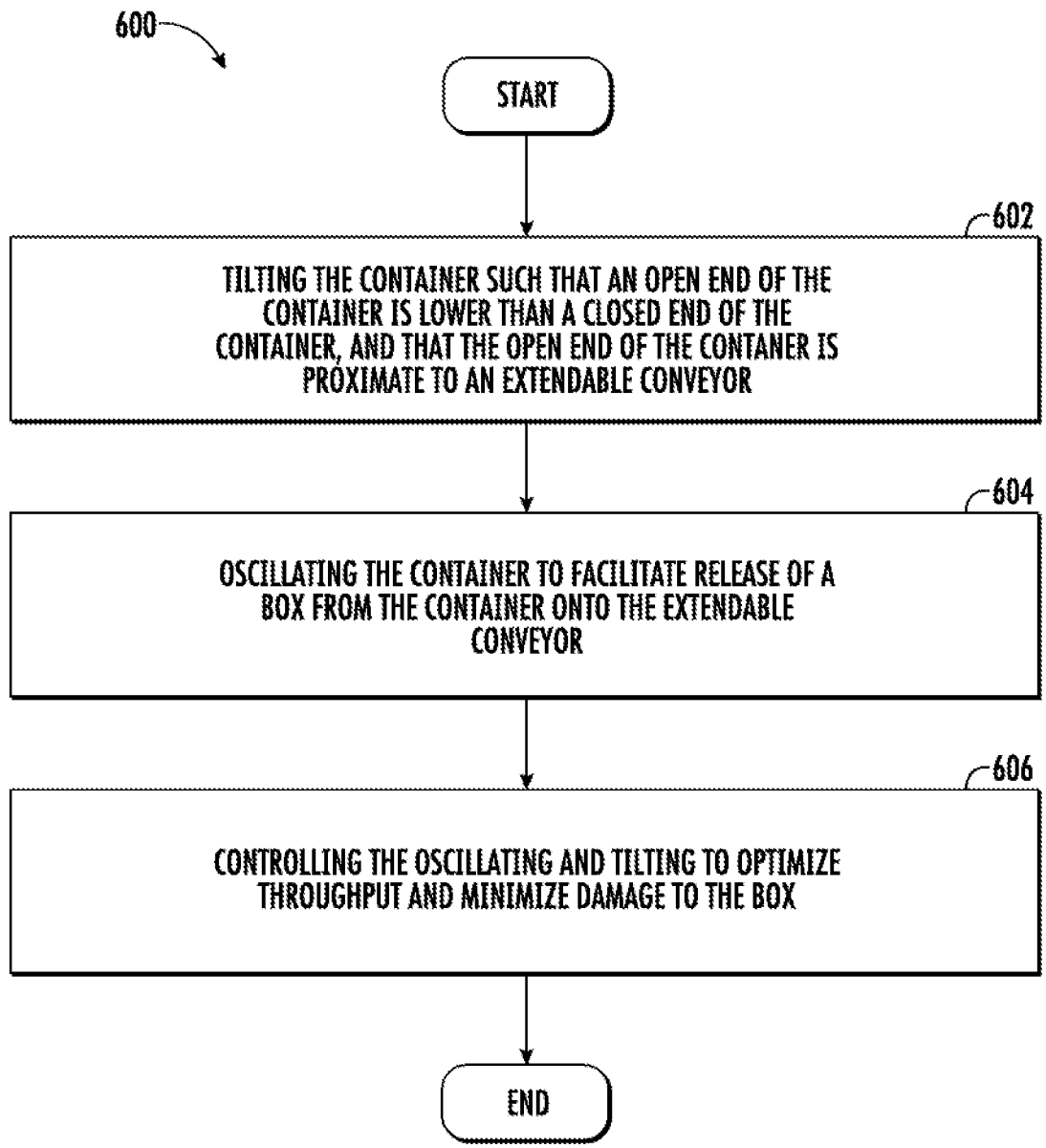
FIG. 6 illustrates an example method for performing unloading in accordance with various aspects and embodiments of the subject disclosure.

FIG. 6 illustrates a process in connection with the aforementioned systems. The process in FIG. 6 can be implemented for example by the systems in FIGS. 1A-5 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 6 illustrates an example method 600 for performing unloading in accordance with various aspects and embodiments of the subject disclosure.

Method 600 can begin at 602 where the method includes tilting the container such that an open end of the container is lower than a closed end of the container, and that the open end of the container is proximate to an extendable conveyor.

At 604, the method includes oscillating the container to facilitate release of a box from the container onto the extendable conveyor.

At 606, the method includes controlling the oscillating and tilting to optimize throughput and minimize damage to the box.

Figure 7:
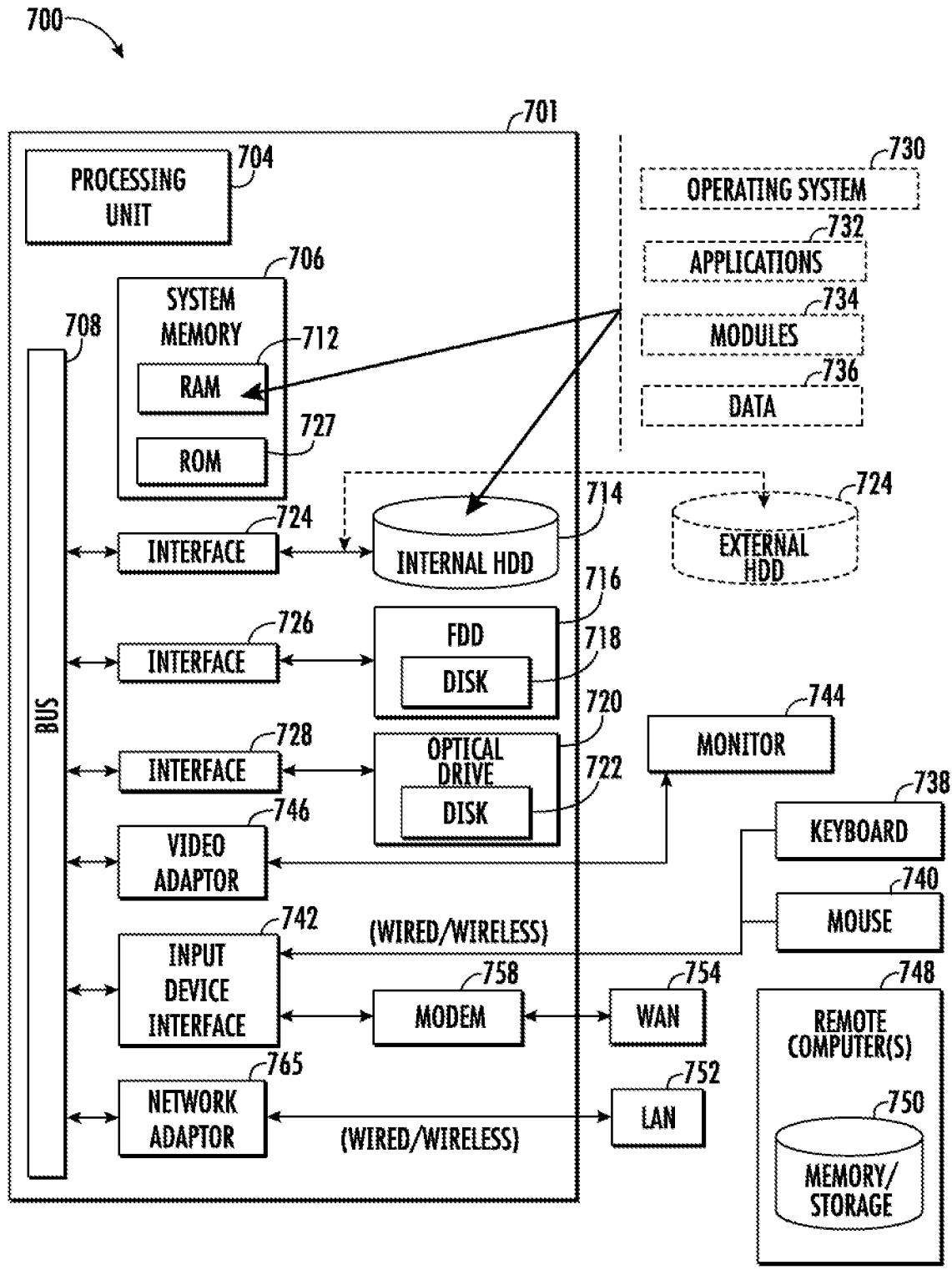
FIG. 7 illustrates an example block diagram of a computer that can be operable to execute processes and methods in accordance with various aspects and embodiments of the subject disclosure.

Referring now to FIG. 7, there is illustrated a block diagram of a computer 700 operable to execute the functions and operations performed in the described example embodiments. For example, a computing device (e.g., anti-sway control system 502) may contain components as described in FIG. 7. The computer 700 can provide networking and communication capabilities between a wired or wireless communication network and a server and/or communication device. In order to provide additional context for various aspects thereof, FIG. 7 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 7, implementing various aspects described herein with regards to the end-user device can include a computer 700, the computer 700 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multiprocessor architectures can also be employed as the processing unit 704.

The system bus 708 can be any of several types of bus structure that can further interconnect to a memory bus (with or without a memory controller), a peripheral bus, and a local bus using any of a variety of commercially available bus architectures. The system memory 706 includes read-only memory (ROM) 727 and random access memory (RAM) 712. A basic input/output system (BIOS) is stored in a non-volatile memory 727 such as ROM, EPROM, EEPROM, which BIOS contains the basic routines that help to transfer information between elements within the computer 700, such as during start-up. The RAM 712 can also include a high-speed RAM such as static RAM for caching data.

The computer 700 further includes an internal hard disk drive (HDD) 714 (e.g., EIDE, SATA), which internal hard disk drive 714 can also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 700 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 700, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 712, including an operating system 730, one or more application programs 732, other program modules 734 and program data 736. All or portions of the operating system, applications, modules, and/or data can also be cached in the RAM 712. It is to be appreciated that the various embodiments can be implemented with various commercially available operating systems or combinations of operating systems.

A user can enter commands and information into the computer 700 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 through an interface, such as a video adapter 746. In addition to the monitor 744, a computer 700 typically includes other peripheral output devices (not shown), such as speakers, printers, etc.

The computer 700 can operate in a networked environment using logical connections by wired and/or wireless communications to one or more remote computers, such as a remote computer(s) 748. The remote computer(s) 748 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 700 is connected to the local network 752 through a wired and/or wireless communication network interface or adapter 756. The adapter 756 may facilitate wired or wireless communication to the LAN 752, which may also include a wireless access point disposed thereon for communicating with the wireless adapter 756.

When used in a WAN networking environment, the computer 700 can include a modem 758, or is connected to a communications server on the WAN 754, or has other means for establishing communications over the WAN 754, such as by way of the Internet. The modem 758, which can be internal or external and a wired or wireless device, is connected to the system bus 708 through the input device interface 742. In a networked environment, program modules depicted relative to the computer, or portions thereof, can be stored in the remote memory/storage device 750. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

That which is claimed:

1. An unloading system, comprising:
   a trailer bed configured to receive a container thereon, wherein the trailer bed comprises one or more joints configurable between a plurality of joint positions, wherein the trailer bed is configured to at least one of lift, tilt, or oscillate at least a portion of the container based at least in part on the one or more joints;
   an extendable conveyor configured to receive a box that has been released from the container and convey the box away from the trailer bed; and
   a closed loop feedback system that optimizes a frequency of a tilt process comprising a repeated forward and a backward motion of the trailer bed to release at least one box from the container.

2. The unloading system of claim 1, wherein the extendable conveyor comprises a slide and a conveyor, wherein the slide receives the box that has been released from the container, and the conveyor receives the box from the slide and conveys the box away from the trailer bed.

3. The unloading system of claim 1, wherein the one or more joints comprise a telescoping joint.

4. The unloading system of claim 1, wherein the container is oscillated at least one of laterally, vertically, and rotationally.

5. The unloading system of claim 1, wherein the closed loop feedback system further optimizes the lifting, and oscillating of the container to improve trailer unloading.

6. The unloading system of claim 5, wherein the closed loop feedback system comprises a set of sensors that measure container volume and box throughput.

7. The unloading system of claim 6, wherein at least a portion of the set of sensors is installed at the trailer bed.

8. The unloading system of claim 1, wherein the trailer bed comprises a set of multi-axial wheels to maneuver the trailer bed.

9. The unloading system of claim 8, wherein the set of multi-axial wheels are configured to maneuver the trailer bed in a lateral direction from a first lateral position to a second lateral position.

10. The unloading system of claim 1, wherein the trailer bed comprises a flood gate that can be at least partially opened to release the box from the container.

11. The unloading system of claim 10, wherein at least partially opening the flood gate of the trailer bed comprises lowering at least a portion of the flood gate.

12. The unloading system of claim 10, wherein the extendable conveyor comprises a platform that can be selectively positioned based at least in part on a height of a top of the flood gate to reduce a distance that the box falls.

13. The unloading system of claim 12, wherein selectively positioning the platform comprises one or both of raising and lowering the platform to match the height of the top of the flood gate.

14. The unloading system of claim 1, wherein the container is tilted at least one of laterally and vertically.

15. The unloading system of claim 1, wherein at least a portion of the extendable conveyor is selectively configurable between a plurality of longitudinal conveyor positions based at least in part on a length of the container.

16. The unloading system of claim 1, wherein the trailer bed further comprises at least one locking mechanism configured to secure at least a portion of the container relative to the trailer bed.

17. A method comprising:
repeatedly tilting a container forward and backward by a trailer bed, wherein an open end of the container is proximate to an extendable conveyor; and
oscillating the container, by the trailer bed, to facilitate release of a box from the container onto the extendable conveyor,
wherein the trailer bed is configured to receive the container thereon, and
wherein a closed loop feedback system optimizes a frequency of a tilt process comprising the repeated tilting of the container forward and backward to release at least one box from the container.

18. The method of claim 17, further comprising:
controlling the oscillating and tilting to optimize throughput and minimize damage to the box.

19. The method of claim 18, further comprising at least partially opening a flood gate positioned at least substantially proximate the open end of the container from a first flood gate position to a second flood gate position.

20. The method of claim 19, further comprising adjusting a height of at least a portion of the extendable conveyor based at least in part on the second flood gate position.

* * * * *